United States Patent Office 3,672,914
Patented June 27, 1972

3,672,914
CONDIMENT CONTAINING SODIUM DIACETATE
William E. Delaney, Chicago, Ill., assignor to Kadison Laboratories, Inc., Chicago, Ill.
No Drawing. Filed Aug. 11, 1970, Ser. No. 63,040
Int. Cl. A23l *1/22;* C12j *1/00*
U.S. Cl. 99—140 R    8 Claims

ABSTRACT OF THE DISCLOSURE

A dry, pulverulent, free flowing condiment which comprises a mixture of sodium chloride and sodium diacetate having a solid coating of an edible, non-hygroscopic, water-soluble material, in conjunction with other ingredients.

---

This invention relates to a dry, pulverulent, free-flowing condiment capable, in the presence of moisture, of imparting the flavor of a dilute acetic acid vinegar solution to foods on which the condiment is applied.

The flavor enhancing properties of vinegar are well known and appreciated by many. Its liquid character, however, detracts from its desirability as a flavoring agent for use in connection with certain foods. Thus, for example, it is common practice to sprinkle vinegar on fish-and-chips. While the desired vinegar flavor is imparted to the fish-and-chips in this way, the crisp character of the coating formed during the preparation of the fish-and-chips is adversely affected in that it becomes soft and soggy due to absorption of the water which comprises the greater proportion of the vinegar sprinkled thereon.

In accordance with the present invention, a dry, pulverulent, free-flowing condiment is provided which enables the full realization of the flavor enhancing properties of vinegar without causing any adverse effects on the palatability of the food products to which it is applied. The essentially dry character of the condiment permits it to be used and stored in a manner similar to that of ordinary table salt. Spillage problems normally encountered with liquid vinegar products are eliminated. The condiment is formulated of readily available, low cost materials, and can be processed and packaged utilizing standard equipment.

The condiment of this invention, in brief, comprises a mixture of sodium chloride and sodium diacetate, the sodium diacetate being provided with an edible protective coating, as described below. The concentration of the sodium diaectate in the composition is such that, upon contact with moisture, the taste attained will be equivalent approximately to that of an edible dilute acetic acid vinegar solution. The hydrolytic conversion of the sodium diacetate occurs in the mouth of a person masticating the food item on which the condiment has been applied, the source of the moisture necessary for the conversion being salivary secretions which normally result from chewing food.

Sodium diacetate ($CH_3$—$COONa.CH_3COOH$) is, per se, well known and it has been used as a source of acetic acid in solid form, liberating about 42% available acetic acid upon being dissolved in water. Its use as such, as a condiment, however, has a number of objections and, so far as I am aware, it has come into little use.

To maintain the condiment in a fully satisfactory dry, free-flowing condition, it has been found desirable to provide the particles of the sodium diacetate with a thin normally solid coating or film of a water-soluble or readily water-dispersible (hereafter, for convenience, generically called "water-soluble") non-hygroscopic material. Especially satisfactory for this purpose are higher fatty acid monoglycerides and diglycerides or mixtures thereof; higher fatty acid polyglycerides; higher fatty acid partial esters of sorbitol and sorbitan; higher fatty acid partial esters of sugars and of methyl glucosides; and, in general, higher fatty acid partial esters of aliphatic water-soluble polyhydric alcohols or polyhydroxy substances; water-soluble gum-like compounds such as sodium carboxymethyl celluloses; prolamins such as zeing or gliadin; and polyhydroxy substances exemplified by polyethylene glycols illustrated by "Carbowax" 1500 and "Carbowax" 1540. Polyethylene glycols of higher molecular weight than about 1500, for instance, up to about 2000 or higher, can also be used. The coating or film may be applied to the sodium diacetate particles in accordance with coating procedures known in the art.

The sodium chloride component of the condiment of the present invention may be in the form of common table slat. Desirably, however, the sodium chloride is employed in the form of fine, rapid-dissolving flakes.

Supplemental ingredients can be added to the condiment, but they are in no way essential to the practice of the present invention. Exemplary of such ingredients are flavoring agents including citric acid, yeast hydrolyzates, dextrose and other sugars, space materials and other flavoring extracts, and the like. Coloring agents such as caramel also can be employed. It has also been found that the free-flowing properties of the condiment can be enhanced, augmented and improved by the incorporation therein of a small amount, usually from about 1% to about 3%, by weight, of a silica aerogel. Especially satisfactory results are attained in this connection with a fumed silica aerogel sold under the trademark "Syoloid" (Davison Chemical Co.).

As indicated above, the proportions of the sodium diacetate and sodium chloride, employed in formulating the condiments of the present invention, should be such that the taste effect achieved by the acetic acid produced upon hydrolysis of the sodium diacetate will be equivalent approximately to that of an edible, dilute acetic acid vinegar solution, that is, a solution comprising from about 3% to about 6%, most advantageously about 4%, acetic acid. This result, in general, is attained with a condiment containing, by weight, from about 30% to about 60% of the sodium diacetate and from about 70% to about 40% of sodium chloride, with the generally optimum objectives of the invention being met by using approximately equal parts, by weight, of the sodium diacetate and sodium chloride.

The following examples are illustrative of dry, pulverulent free flowing compositions falling within the scope of the invention. It will be understood that other compositions can be evolved following the guiding principles and teachings provided herein. The numerical values represent parts by weight.

EXAMPLE 1

| | |
|---|---|
| Fine flake sodium chloride | 40 |
| Sodium diacetate (coated with "Carbowax" 1504) | 39 |
| Citric acid | 9 |
| Yeast hydrolyzate (Bioferm Yeast #36) | 9 |
| Caramel (burnt sugar shade 85%) | 1 |
| Silica aerogel (Syoloid) | 2 |

EXAMPLE 2

| | |
|---|---|
| Fine flake sodium chloride | 50 |
| Sodium diacetate (coated with "Carbowax" 1500) | 50 |

EXAMPLE 3

| | |
|---|---|
| Sodium chloride | 45 |
| Sodium diacetate (coated with zein) | 36 |
| Citric acid | 8 |
| Dextrose | 8 |
| Caramel | 1 |
| Silica aerogel (Syoloid) | 2 |

EXAMPLE 4

| | |
|---|---|
| Sodium chloride | 42 |
| Sodium diacetate (coated with zein) | 42 |
| Citric acid | 7 |
| Yeast hydrolyzate (Bioferm Yeast #36) | 7 |
| Caramel | 1 |
| Silica aerogel (Syoloid) | 1 |

EXAMPLE 5

| | |
|---|---|
| Sodium chloride | 35 |
| Sodium diacetate (coated with "Carbowax" 1540) | 45 |
| Citric acid hydrate | 10 |
| Sucrose | 7 |
| Caramel | 1 |
| Silica aerogel | 2 |

While the condiment of the present invention is especially useful as a flavoring agent for food products such as fish-and-chips, it can be used in conjunction with other food-stuffs such as tomato juice, mustard, soya powder, pepper, and the like, to impart a vinegar flavor thereto. The selection and proportioning of such combination is, of course, well within the skill of those in the art in view of the disclosures and teachings contained herein.

What is claimed is:

1. A dry, pulverulent, free-flowing condiment for use in a dry condition on food items, comprising a mixture of sodium chloride and sodium diacetate, said sodium diacetate having a solid coating thereon of an edible, substantially non-hydroscopic, water-soluble material, the concentration of sodium diacetate in said mixture being such that upon hydrolysis thereof the taste effect will be equivalent approximately to that of an edible, dilute acetic acid vinegar solution, said condiment being adapted to be applied to a food in a dry condition, the hydrolysis of the sodium diacetate comprising the condiment taking place in the mouth of a person during mastication of the food on which the condiment has been applied.

2. A condiment according to claim 1 wherein the sodium diacetate and the sodium chloride comprise about equal parts, by weight of the mixture.

3. A condiment according to claim 1 wherein the coating material is a polyethylene glycol.

4. A condiment according to claim 1 wherein the sodium diacetate comprises, by weight, from about 30% to about 60% of the mixture and the sodium chloride comprises, by weight, about 70% to about 40% of the mixture, and the coating is a polyethylene glycol having a molecular weight in the range of about 1500 to about 2000.

5. A condiment according to claim 1 wherein a small amount of a silica aerogel is added to the condiment to enhance the free-flowing properties of the condiment.

6. A condiment according to claim 1 comprising, by weight, about 40% sodium chloride, about 39% sodium diacetate crystals having a thin coating of a polyethylene glycol thereon, about 9% citric acid, about 10% of flavoring agents, and about 2% of a silica aerogel.

7. A condiment according to claim 1 wherein flavoring agents are added to the condiment.

8. A condiment according to claim 7 wherein the flavoring agents are selected from the group consisting of citric acid, a sugar, yeast hydrolyzate and caramel.

References Cited

UNITED STATES PATENTS

| | | | |
|---|---|---|---|
| 2,475,368 | 7/1949 | Bauer | 99—142 X |
| 2,636,824 | 4/1953 | Ansel | 99—140 |
| 3,385,713 | 5/1968 | Levinson | 99—140 |

FOREIGN PATENTS

| | | | |
|---|---|---|---|
| 152,946 | 10/1920 | Great Britain | 99—147 |

MORRIS O. WOLK, Primary Examiner

S. MARANTZ, Assistant Examiner

U.S. Cl. X.R.

99—147; 260—541